STATISTICAL MACHINE

Filed April 6, 1962 3 Sheets-Sheet 1

INVENTOR.
GIUSEPPE TARCHINI
BY Kenyon & Kenyon
ATTORNEYS

Sept. 21, 1965 G. TARCHINI 3,208,051

STATISTICAL MACHINE

Filed April 6, 1962 3 Sheets-Sheet 2

INVENTOR.
GIUSEPPE TARCHINI

BY Kenyon & Kenyon
ATTORNEYS

INVENTOR.
GIUSEPPE TARCHINI
BY
Kenyon & Kenyon
ATTORNEYS

United States Patent Office 3,208,051

Patented Sept. 21, 1965

3,208,051

STATISTICAL MACHINE

Giuseppe Tarchini, Genoa, Italy, assignor to Ing. C. Olivetti & C., S.p.A., Ivrea, Italy, a corporation of Italy Filed Apr. 6, 1962, Ser. No. 185,606
5 Claims. (Cl. 340—172.5)

The present invention generally relates to statistical machines. More particularly, the invention relates to an apparatus for processing coded characters stored in a storage medium, for instance a perforated tape, said characters being read-out in series from said storage medium.

A statistical machine is known having a plurality of totalizers and being adapted to read from either a punched paper or a magnetic tape a series of numerical data recorded therein and to distribute them to said totalizers, under the control of addressing codes associated with each one of said data.

Furthermore, a machine is known which is adapted to perform a selective reading of the data recorded in a tape, whereby as the tape is passed in front of a reading device, only those data are read-out which correspond to previously established selection critera. However, this machine requires the data to be recorded in the tape according to special arrangements due to the reduced flexibility of the selection critera. Moreover, this machine has no means for addressing the data read-out from the tape.

The primary object of the present invention is to provide an apparatus for processing coded characters stored in a storage medium, which apparatus combines the possibilities of the known machines and which eliminates the disadvantages thereof.

A further object of the invention is to provide an apparatus which presents an increased flexiblity in the selection criteria and in data addressing.

According to the invention, the present apparatus comprises means for sequentially reading out said coded characters, code recognition means fed by said reading means and having an output for each one of a plurality of character codes, each output being adapted to be energized in response to every read-out character having the code corresponding to said output and being adapted to be deenergized in response to every character having another code of said plurality, means for receiving coded characters, gating means connecting said reading means to said receiving means, and manually settable means for rendering said gating means responsive to preselected ones of said outputs.

Figure 1A:
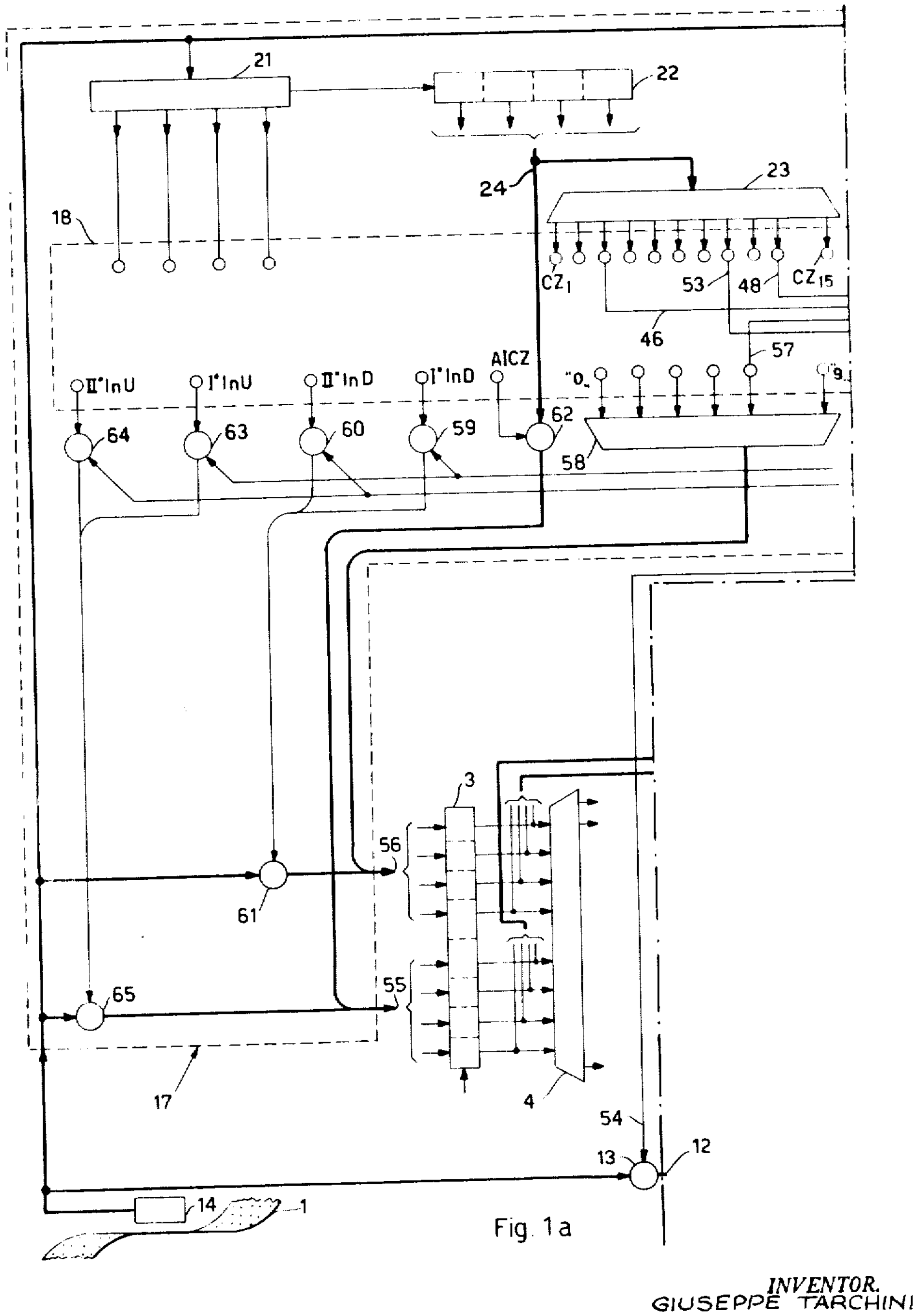
Figure 1B:
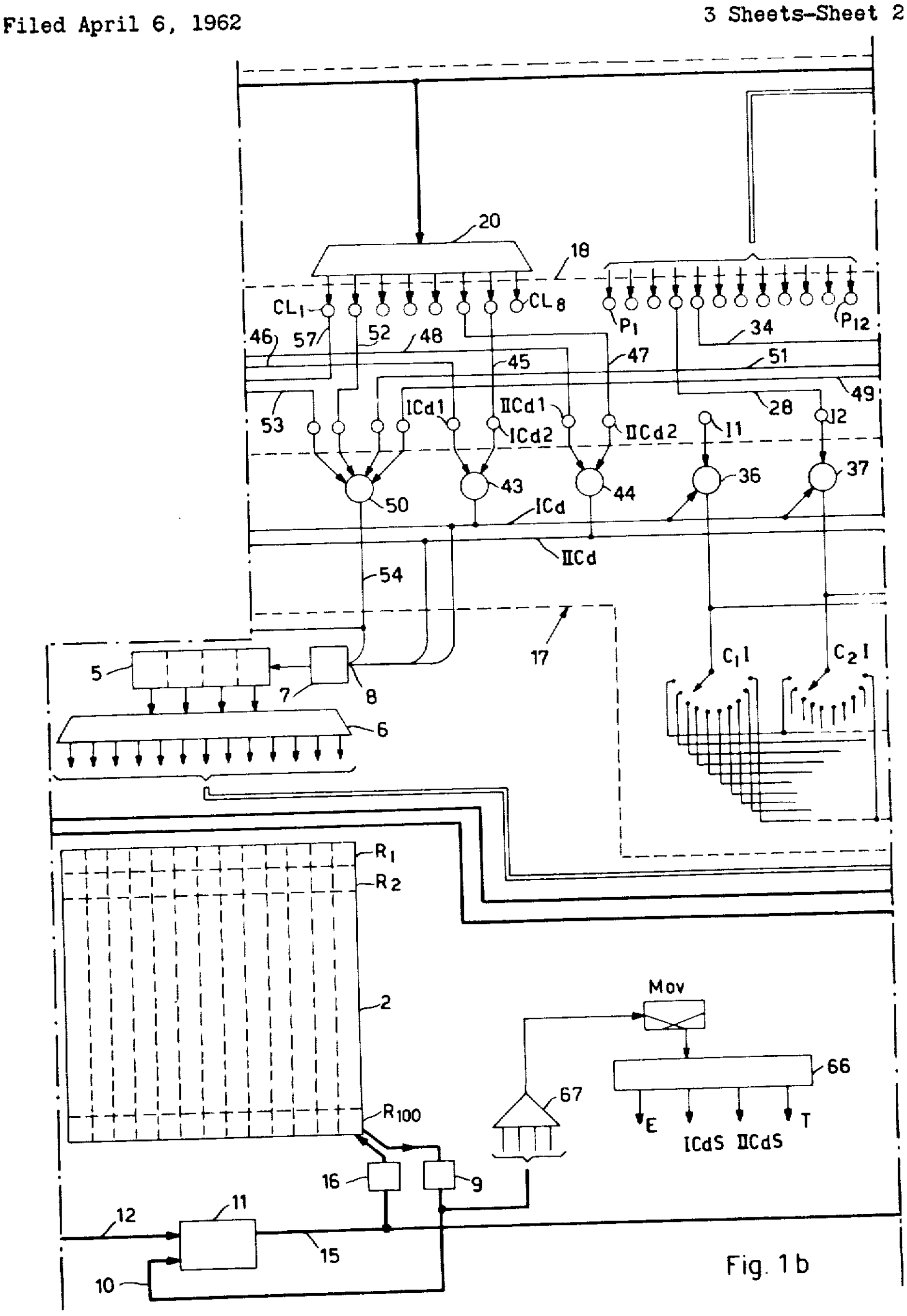
Figures 1C, 2:
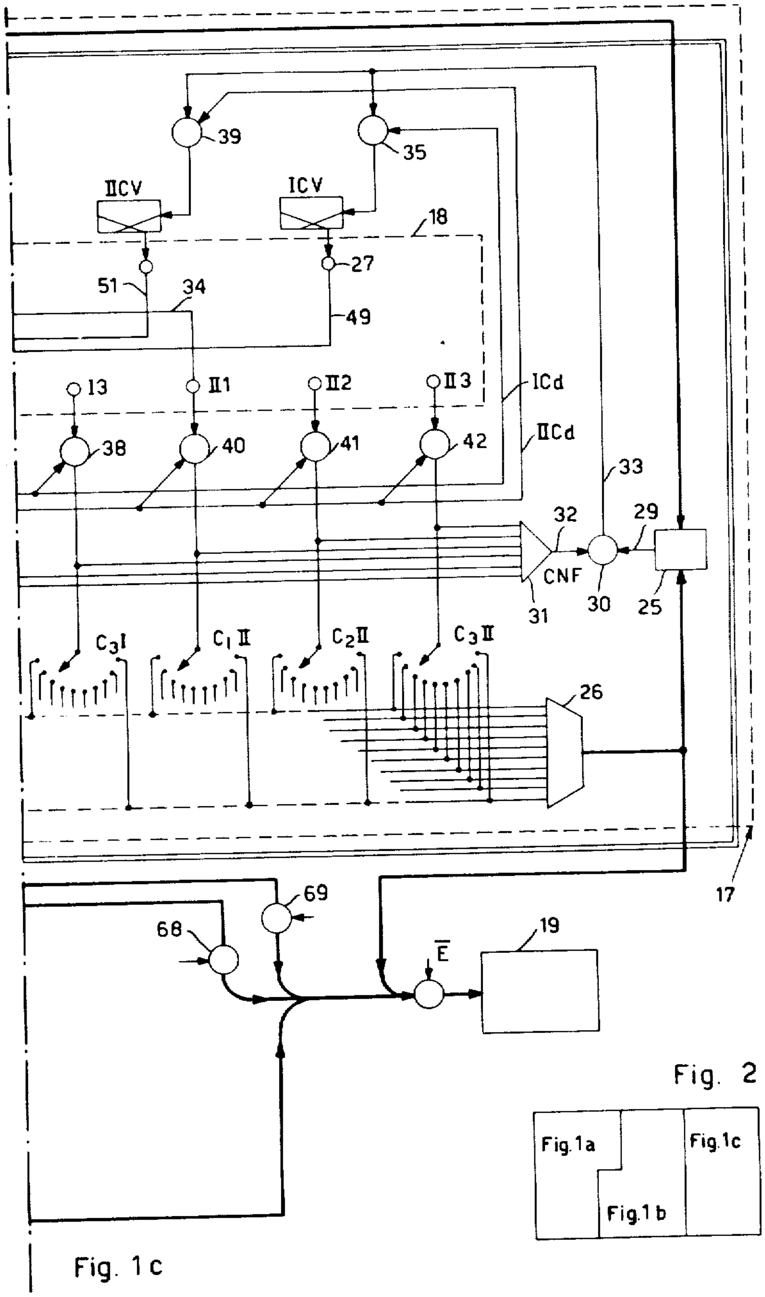

This and other objects and features of the invention will become apparent from the following description of a preferred embodiment thereof, taken in conjunction with the accompanying drawings, in which:

FIGS. 1*a*, 1*b*, 1*c* show a diagram of the logical circuits of the device according to the invention;

FIG. 2 shows how FIGS. 1*a*, 1*b*, 1*c* are to be composed.

In the figures a thick line represents a signal path along which a character is transferred in parallel; therefore said thick line is formed either of 4 or 6 lines, in the case of a code having either 4 or 6 binary units for numerical or alpha-numerical characters, respectively. On the contrary, a thin line represents a path for a single binary signal or bit.

The device is adapted to sequentially read and process the characters stored in a storage medium, for instance recorded in a punched tape 1.

With respect to the organization of the data recorded in the tape 1, the following definitions will be employed throughout the specification:

Zone: group of consecutive characters, said group being preceded by a special character CZ. The character CZ may have four different codes CZA, CZB, CZC, CZD.

A datum consists of a whole zone of characters.

Block: group of contiguous zones, said group being preceded by a special character CL. The character CL may have one of eight different codes, CL1 to CL8. In the present embodiment, a block is supposed to comprise not more than 15 zones.

Sequence: a group of contiguous blocks. The tape may be arbitrarily subdivided into a succession of contiguous sequences, each sequence being formed of a group of contiguous blocks. The beginning of each sequence is indicated by one of said characters CL, the code of said character being preselected among said eight codes during the programming. Furthermore, within each one of said sequences some subsequences may be defined, as will be seen later.

Any zone of the tape may have the meaning of a numerical datum; in the following example said datum comprises up to 13 characters, i.e. each numerical datum comprises not more than 12 decimal digits in addition to its algebraic sign.

The apparatus comprises a store 2 provided with 100 registers or totalizers R1 . . . R100 each one comprising 13 decimal cells and therefore being adapted to store a number having 12 decimal digits in addition to the algebraic sign. A counter 3, having a decoder 4 associated therewith, said decoder being provided with 100 output terminals, is adapted to select one of the 100 registers at a time. A character counter 5, associated with a decoder 6, is adapted to sequentially select the 13 cells of the actually selected register. The counter 5 is controlled by a circuit 7 known per se, which, upon receiving at the input terminal 8 a consent signal, causes the same counter to start a whole counting cycle, by feeding to it 13 counting pulses.

Upon having selected a certain register, whenever a register cell is selected the decimal digit stored therein is read-out through a reading circuit 9 and supplied to an input terminal 10 of an arithmetic unit 11, wherein it is added to the decimal digit represented by the numerical character, if any, which is present at an input terminal 12. Said terminal 12 is fed, through a gate 13, by the tape reader 14. The decimal digit resulting from the addition is obtained on the output terminal 15 of the arithmetic unit and is automatically rewritten through a writing circuit 16 in the same cell of the register, while the arithmetic unit retains in a known manner the tens carry-over, which will be added to the pair of digits which will subsequently appear at the input terminals 12 and 10, respectively.

Therefore, it is clear that, with respect to any decimal number supplied, decimal digit by decimal digit, from the tape 1 to the input terminal 12, the actually selected register acts as a totalizer having a capacity of 12 digits and the algebraic sign.

The typical mode of operation of the machine comprises two distinct steps characterized by signals L and S, respectively, which are emitted in a manner to be described later. In the reading step the reader 14 scans the tape 1; in said step only the data corresponding to predetermined selection criteria are fed to the input terminal 12, i.e. totalized in the store 2. The selection is performed according to some informations which accompany the data on the tape. Each datum so selected is addressed to a predetermined register under the control of addresses which accompany the datum on the tape.

The above-mentioned data selecting and addressing operations are performed by a circuit 17 fed by the reader 14. Said circuit 17 controls the gate 13 interposed between the reader 14 and the input terminal 12, so as to allow the passage of the selected data only, and the address register 3, so as to select a preselected register for each datum. The selection criteria and the addressing criteria are predetermined by means of a plug-board 18 and two sets of commutators C1I, C2I, C3I and C1II, C2II, C3II, each commutator having ten positions.

In the step S, the registers are interrogated one after the other and the totals stored therein are printed, with other informations, by a conventional printing unit 19.

The passage from a step to another is controlled in a known manner by the operator by means of a suitable commutator which alternatively emits the signals L and S.

The structure and operation of the apparatus for selecting the data during the reading of the tape 1 will be now described.

The reader 14 sequentially reads out the characters of the tape 1, and supplies them to a decoder and staticizer 20 of characters CL, having an output terminal CL1 to CL8 for each one of the eight possible codes CL1 to CL8 of the characters CL, and adapted to recognize said codes and to energize one of its eight outputs CL1 to CL8 in response to every read-out character having the code corresponding to said output, and to maintain it energized until the reading of another character having another of said codes CL1 to CL8.

Furthermore, the reader 14 feeds a decoder 21 of characters CZ, adapted to energize one of its outputs when one of the four possible characters CZ is read-out. The decoder 21 feeds a counter 22 of characters CZ. The counter 22, which is reset upon reading each character CL, that is at the beginning of each block, is adapted to count the characters CZ, that is the zones which follow said character CL, so as to sequentially energize the fifteen output terminals of a decoder 23 associated therewith. The counter 22 furthermore provides on the output terminal 24 a binary representation of its contents. Therefore, the counter 22 with the associated decoder 23 having a plurality of outputs CZ1 to CZ15 acts as counting means having a start condition and responsive to read-out characters having a code CZ for sequentially energizing said outputs and further responsive to each read-out character having one of the codes CL for being reset to said start condition.

The reader 14 moreover feeds a circuit adapted to recognize the presence of a predetermined group of characters in a zone of the tape. In the present embodiment said group may comprise any number from one to three characters. Said group is predetermined by manually setting-up one to three corresponding decimal digits on the ten position commutators C1I, C2I, C3I, respectively. Said digits, which form a first group of reference characters, are first decoded into the binary code by a decoder 26 and then compared by means of a comparator 25 with one to three characters present in predetermined positions of each zone, so that upon coincidence therewith a signal is obtained on the output terminal of a flip-flop ICV.

More particularly, the character counter 5 is adapted to count the first twelve characters of each zone to sequentially energize the twelve output terminals of the decoder 6 associated therewith, and therefore also the plug-sockets P1 to P12 connected with said output terminals.

To select among said twelve characters the characters to be compared with the digits set-up on the commutators C1I, C2I, C3I, the plug-sockets I1, I2, I3 of said commutators are connected by means of plug-connections 28, with as many plug-sockets P1 to P12.

If, for instance, the commutators C1I, C2I, C3I have been perset on the number 473 and the plug-sockets I1, I2, I3 are connected with the plug-sockets P1, P4, P9, respectively, the machine is able to recognize all the tape zones wherein the first, the fourth and the ninth character are equal to 4, 7, and 3, respectively.

The comparator 25 compares each character read from the reader 14 with the digit supplied by the decoder 26 and furnishes a signal to the input terminal 29 of an "and" circuit 30 in the case of discordance.

An "or" circuit 31 is fed by all the commutators C1I, C2I, C3I, whereby its output 32 is energized every time the reader 14 reads a character to be compared, so that it furnishes to the "and" circuit 30 a signal CNF indicating that the character actually read by the reader 14 is a character of those interested in the comparison.

In the case of discordance in the comparison, the output 33 of the circuit 30 is energized, so that the output 27 of the flip-flop ICV is deenergized. Said output is automatically energized, through a connection not shown in the drawings, by the counter 5 when said counter starts to count the characters of the considered zone.

On the contrary, in the case of accordance at the comparison of a pair of characters, the output 33 is not energized, whereby the output of the flip-flop ICV remains energized if it had been previously energized.

During the reading of the following character interested in the comparison, the flip-flop is deenergized or remains energized according as to whether a discordance or an accordance is detected, and so on, whereby while the reading *a* zone, the flip-flop ICV, which is energized at the beginning of the reading of said zone, will remain energized as long as the following characters of said zone interested in the comparison are found to agree with the corresponding digits set-up on the commutators C1I, C2I, C3I.

If for all the characters to be compared within the zone there has been accordance, the flip-flop ICV remains energized until the beginning of the reading of the next following zone interested in the comparison.

A second set of for instance three commutators C1II, C2II, and C3II, each one having a plug-socket II1, II2 and II3, respectively, to which plug-connections 34 may be made, controls a second flip-flop IICV through the same circuit 26, 25, 30, 31, 5, 6 as in the previously shown manner, whereby a preselected group of characters of each zone of the tape may be further compared with another number set-up, as a second set of reference characters, on said commutators C1II, C2II, C3II.

In the foregoing description it has been assumed that all the tape zones should be compared with the number set-up either on the commutators C1I, C2I, C3I or C1II, C2II, C3II. Yet it is possible to limit the comparison to some selected zones. To this end a first set of "and" gates 35, 36, 37, 38 and a second set of "and" gates 39, 40, 41, 42, whose opening is controlled by the output terminals IC*d* and IIC*d*, respectively, of two coincidence circuits 43 and 44, respectively, allow the first and the second set of commutators, respectively, and the corresponding comparison circuit to be selectively enabled to operate, whereby among all the tape zones subsequently read by the reader 14 the zones to be compared may be selected.

The selection criterion for the zones interested in the comparison is established by means of plug-connections between the input terminals of the gates 43 and 44 and the output terminals of the decoders 20 and 23.

For instance, by connecting the input terminals of the gate 43 with the output terminals CZ3, and CL7, the comparison with the first commutator set is limited to the third zone of the only sequences which begin with said particular code CL7.

It will thus be apparent that the apparatus is adapted to perform a selection of the data read on the tape according to the following criteria:

(*a*) *Recognition of a sequence.*—The sequence is defined according to the following criterion: it begins with the character CL whose code corresponds to the output terminal of the decoder 20 which is connected to the input IC*d*2 of the gate 43 through the plug-connection 45 and it ends with the next character CL equal to the first one, i.e. when the next sequence starts.

The apparatus is adapted to recognize, among the sequences so defined, the sequences which meet the following criterion: in the *n*th zone which follows said character CL, one to three characters selected among the first twelve characters of said zone should coincide respectively with one to three corresponding digits set-up on the commutators of the first set C1I, C2I, C3I, *n* being the order number of the plug-socket CZ*n* of the decoder 23 connected with the input ICd1 of the gate 43 through the plug-connection 46. In this manner the connection to the plug-socket ICd2 predetermines a character CL as a start-of-sequence character, whereby it determines the criterion for dividing the characters read from the tape into sequence, thus defining the extension of the sequences on the tape, while the connections to the plug-sockets ICd1 and I1, I2, I3 establish the selection criterion among the so defined sequencies. The effective recognition of the sequence is indicated by the fact that the flip-flop ICV remains energized after the reading of all said characters.

(*b*) *Recognition of a subsequence* in the selected sequence.

The subsequence is defined according to the following criterion: it starts with the character CL having a code which corresponds to that output of the decoder 20 which is connected to the input IICd2 of the gate through the plug-connection 47 and it ends with the next character CL equal to the first one.

The apparatus is adapted to recognize, among the so defined subsequences, the subsequences meeting the following criterion: in the *n*th zone which follows said character CL one to three characters selected among the first twelve characters of said zone should coincide respectively with one to three digits set up on the commutators of the second set C1II, C2II, C3II, *n* being the order number of that plug-socket CZ*n* of the decoder 23 which is connected to the input IICd1 of the gate 44 through the plug-connection 48. In this manner the connection to the plug-socket IICd2 defines the extension of the subsequences on the tape, while the connection to the plug-sockets IICd1 and II1, II2, II3 establishes the selection criterion among the so defined subsequences. The effective recognition of the subsequence is indicated by the fact that the flip-flop IICV remains energized after the reading of all said characters.

(*c*) *Recognition of a block* beginning with a character CL having a predetermined code.

The effective recognition is indicated by the energization of that output of the decoder 20 which corresponds to said code.

(*d*) *Recognition of the* nth *zone of a block*.—The effective recognition is indicated by the energization of the output CZ*n* of the decoder 23 associated with the zone counter 22.

The criteria *a*, *b*, *c* and *d* may be combined in different manners to determine the selection of a datum and are interrelated to each other as follows.

By plug-connecting through a line 49 an input of a coincidence circuit 50 with the output of the flip-flop ICV, the selection of the sole data belonging to the sequences which meet the criterion *a* is established.

By plug-connecting through a line 50 an input of the coincidence circuit 50 with the output of the flip-flop IICV, the selection, among said selected sequences, of the sole subsequences which meet the criterion *b* is established.

By plug-connecting through a line 52 an input of the circuit 50 with the output of the decoder 20 defined in the criterion *c*, the selection of the sole blocks which meet said criterion is established; if, in this case, the connection 49 has been made, the selection is limited to the sole sequences which meet the criterion *a*; if the connection 51 has been also made, the selection is further limited to the sole subsequences which meet the criterion *b*.

By plug-connecting through a line 53 an input of the circuit 50 with the output of the decoder 23 as defined in the criterion *d*, the selection of the sole zones which meet said criterion is established, said selection being limited to the aforesaid blocks, subsequences and sequences, when the connections 44, 51 and 52, respectively, have been made.

The output 54 of the coincidence circuit 50 controls the opening of the gate 13 interposed between the tape reader 14 and the input 12 of the totalizers.

From the preceding description it is also apparent that by manually setting the plug-connections of the plugboard 18, some zones of the tape, namely the zones defined by the plug-connections to the input terminals of the coincidence circuits 43 and 44, are selected for making a search therein with respect to the character group to be compared with the reference number set-up either in the first or in the second set of commutators: a so selected zone will be called first or second parameter, respectively. Each sequence and each subsequence contains a first and a second parameter, respectively. Other zones, namely the zones defined by the plug-connections between the input terminals of the coincidence circuit 50 and the decoders 20 and 23, are simultaneously selected to be considered as data to be transmitted to the totalizers, said transmission being effected if the parameters of the sequence and subsequence including said data are in accordance with the reference numbers set-up in the commutators.

It will thus be apparent that the tape zones to be considered as data or as parameters may be selected by the programmer at will, provided in each sequence the parameters precede the data. Furthermore, by suitably plug-connecting some inputs of the coincidence circuits 43, 44, 50 to an output of the decoder 21, the sole data and parameters which are preceded by a character CZ having a code corresponding to said output may be selected.

The structure and operation of the apparatus for addressing the store registers when reading the tape will now be described.

One among the hundred registers may be addressed, as previously stated, by means of the address register 3.

Said hundred registers are subdivided in 10 tens. The units and tens addresses may be supplied to the address register 3 through the input terminals 55 and 56, respectively.

The tens address may be predetermined by the programmer according to a selected one of two following criteria:

(A) By plug-connecting through a line 57 an output CL of the decoder 20 with the *n*th input terminal among the ten input terminals of a decimal-to-binary decoder 58 it will be established to address into the registers of the *n*th ten of the store the data which are preceded on the tape by the corresponding character CL.

In fact, when said character CL is read-out from the tape, the corresponding output of the decoder 20 is energized, and therefore, through the line 57 and the decoder 58, the address of *n*th ten, that is the binary representation of the decimal digit *n*, is supplied to the input 56 of the address register 3.

(B) By plug-connecting the *n*th plug-socket P*n* of the plug-sockets P1 to P12 of the character counter 5 with the input I⁰I*n*D or II⁰I*n*D of a coincidence circuit 59 or 60, respectively, it will be established to assume as tens address for the data belonging to a certain sequence or subsequence, respectively, the digit represented by the *n*th character of the first or second parameter, respectively, of said sequence or subsequence, respectively.

In fact, when said zone representing a parameter is read by the reader 14, the output of the coincidence circuit 43 or 44, respectively, is energized as has been described above. Therefore, during the reading of the *n*th character of said zone, that is when the character counter 5 energizes the output P*n*, the output of the circuit 59 or 60, respectively, is energized so as to open a gate 61, through which said character is transferred, as tens address, to the input 56 of the address register 3.

Likewise, the units address may be predetermined by the programmer according to a selected one of two following criteria:

(C) By energizing the input AICZ of a gate 62 by means of a plug-connection to a voltage source not shown in the drawings, it will be established to assume, as units address, the contents of the zone counter 22.

In fact, in this case the output 24 of said counter and the input 55 of the address register 3 are connected through said gate 62. Having thus established the tens address according to the criterion A or B, the data read from the tape will be addressed according to their order to the registers of the ten indicated by said tens address.

(D) By plug-connecting the $n$th plug-socket P$n$ of the plug-sockets P1 to P12 of the character counter 5 to the input I$^0$I$n$U or II$^0$I$n$U of a coincidence circuit 63 or 64, respectively, it will be established to assume, as units address for the data belonging to a certain sequence or subsequence, respectively, the digit represented by the $n$th character of the first or second parameter, respectively, of said sequence or subsequence, respectively.

In fact, when said zone representing a parameter is read by the reader 14, the output of the coincidence circuit 43 or 44, respectively, is energized as has been described above. Then, during the reading of the $n$th character of said zone, that is when the character counter 5 energizes the output P$n$, the output of the circuit 63 or 64, respectively, is energized so as to open a gate 65 through which said character is transferred as units address to the input 55 of the address register 3.

The aforesaid addressing criteria A, B, C, D may be variably combined according to the operator's choice.

When reading the tape, every time a register has been selected a special mark or bit is automatically stored in a manner known per se in a predetermined position of the thirteenth cell of the register. Said bit will be used when printing the results during the step S, to distinguish the registers which contain only zeroes because they have never been selected from the registers which contain only zeroes because they have been cleared as a result of the totalization.

As an example a perforated tape will now be considered, which contains among other sequences a plurality of sequences of the following type, where a line represents a plurality of consecutive characters, while a point separates two contiguous characters:

$$CL_s-CZ_x.C_1.C_2.C_3.CZ_{x+1}-$$
$$-CL_t-CZ_n.C_4.C_5.C_6.CZ_{n+1}-CZ_m.C_7.C_8.C_9.C_{10}.C_{11}-$$

N times

Each sequence begins with a character having the code $CL_s$ and includes N subsequences, each one beginning with a character having the code $CL_t$.

It will now be assumed that each sequence represents an invoice: the character $CL_s$ is followed by a group of characters which represent the heading of said invoice, said heading comprising a first parameter which is located after $x$th start-or-zone character CZ beginning from said character $CL_s$, is formed of the characters C1, C2 and C3 and represents a sales district; each subsequence represents a line of the invoice, and comprises a second parameter, which is located after the $n$th start-of-zone character CZ of said subsequence, is formed of the characters C4, C5 and C6 and represents the merchandise category for the sale transaction of said line. Said subsequence further comprises, after the $m$th start-of-zone character CZ, the amount to be paid for said last mentioned sale transaction.

By passing the tape one time only under the reader 14, a statistics of the sales for a predetermined sales district may be obtained; within said district, the total amounts to be paid for each merchandise category may be obtained.

To this end the commutators of the first set are set up according to the code of said sales district, so as to select, according to the criterion $a$, only the sequences, and thus invoices belonging to said district; furthermore, the characters of the second parameter are used, according to the criteria B and D, for addressing all the amounts corresponding to each merchandise category into a separate register for said category.

Furthermore, if more than 100 categories are concerned, the second parameter may be also used for selecting, according to the criterion $b$, only certain subsequences, namely the subsequences which represent invoice lines corresponding to the first 100 categories, the remaining categories being dealth with in further passes of the tape under the reader 14.

The structure and operation of the apparatus for printing the results will be now described.

During the printing step S the hundred totals contained in the hundred registers are printed after each other. With each total the address of the corresponding register may be printed, said addresses consisting of a digit for the units and a digit for the tens, and two numerical codes equal to the numbers set-up on the commutators C1I, C2I, C3I and C1II, C2II, C3II may be printed as well.

During the printing step S, at the beginning thereof the address register 3 is reset, so as to select the first store register R1; the counter 5 is also reset.

For each register a scanning phase E is executed, after which other phases may follow.

The sequence of said phases is controlled by a signal distributor 66. More particularly, during the phase E, under the control of the signal E supplied to the counter 5, a whole counting cycle of the counter 5 is performed, whereby all the cells of the first register R1 are interrogated after each other.

If the contents of at least one cell is different from 0 a flip-flop M$ov$ is energized through an "or" circuit 67 fed by the reading circuit of the store. In this case the distributor 66 causes other three phases IC$d$S, IIC$d$S and T to follow, under the control of the flip-flop M$ov$.

During the phase IC$d$S the distributor 66 first sends a signal to a gate 69 through which the units digit of the address of the actually selected register is transmitted to the printing unit 19; then said distributor opens a gate 68, whereby the tens digit of said address is printed. At last, said distributor starts the counter 5 for causing it to perform a whole counting cycle, during which the digits set-up on the commutators C1I, C2I, C3I are printed after each other, because the plug-sockets P1 to P12 are sequentially energized, and because the distributor 66 energizes the line IC$d$ by means of the signal IC$d$S supplied thereto.

During the phase IIC$d$S a whole counting cycle of the counter 5 is performed as well, during which the digits set-up in the commutators C1II, C2II, C3II are similarly printed. In fact, during said phase the distributor 66 energizes the line IIC$d$ by feeding it with the signal IIC$d$S.

Finally, during the phase T a signal produced by the distributor 66 starts the counter 5 for causing it to perform a fourth counting cycle, during which the store circuits are also energized, so that the thirteen cells of the actually selected register are interrogated for printing the contents thereof. At the end of the phase T the distributor 66 finally produces a counting signal for the address register 3, which is thus caused to select the next following register R2. In the meantime the distributor 66 returns to the phase E.

On the contrary, if during the phase E the contents of all the cells is found to be equal to zero, the flip-flop M$ov$ is not energized. In this case, at the end of the counting cycle of the counter 5, a counting signal is sent to the address register 3, whereby said register is caused immediately to select the next following register R2.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

What I claim is:

1. An apparatus for processing coded characters stored in a storage medium, comprising in combination:
(a) means for sequentially reading out said coded characters,
(b) code recognition means fed by said reading means and having an output for each one of a plurality of character codes, each output being adapted to be energized in response to every read-out character having the code corresponding to said output and being further adapted to be deenergized in response to every character having another code of said plurality,
(c) means for receiving coded characters,
(d) gating means for connecting said reading means to said receiving means,
(e) and manually settable means for rendering said gating means responsive to the energization of predetermined ones of said outputs.

2. An apparatus for processing coded characters stored in a storage medium, comprising in combination:
(a) means for sequentially reading out said characters,
(b) code recognition means fed by said reading means and having a first output for each one of a plurality of character codes, each first output being adapted to be energized in response to every read-out character having the code corresponding to said first output and being further adapted to be deenergized in response to every character having another code of said plurality,
(c) means for receiving coded characters,
(d) gating means for connecting said reading means to said receiving means,
(e) counting means fed by said reading means and having a plurality of second outputs, said counting means having a start condition and being responsive to read-out characters having a predetermined code for sequentially energizing said second outputs and being further responsive to each read-out character having one of the codes of said plurality for being reset to said start condition.
(f) and manually settable means for rendering said gating means jointly responsive to the energization of predetermined ones of said first and second outputs.

3. An apparatus for processing coded characters stored in a storage medium, comprising in combination:
(a) means for sequentially reading out said characters,
(b) code recognition means fed by said reading means and having a first output for each one of a plurality of character codes, each first output being adapted to be energized in response to every read-out character having the code corresponding to said first output and being further adapted to be deenergized in response to every character having another code of said plurality,
(c) means for receiving coded characters,
(d) gating means for connecting said reading means to said receiving means,
(e) counting means fed by said reading means and having a plurality of second outputs, said counting means having a start condition and being responsive to read-out characters having a predetermined code for sequentially energizing said second outputs, and being further responsive to each read-out character having one of the codes of said plurality of codes for being reset to said start condition.
(f) a character counter fed by said reading means and having a plurality of third outputs, said counter having a start condition and being responsive to read-out characters for sequentially energizing said third outputs and being further responsive to each read-out character having said predetermined code for being reset to said last mentioned start condition,
(g) means having a plurality of denominations each one adapted to contain a reference character, said denominations having a common output and each denomination having means for enabling the corresponding reference character to be extracted on said common output,
(h) manually settable means for rendering each one of said enabling means responsive to the energization of predetermined ones of said plurality of third outputs,
(i) a character comparator jointly fed by said reading means and said common output and adapted to produce a signal in response to each pair of fed characters having different codes,
(k) a bistable circuit settable in response to a character having said predetermined code and resettable in response to said signal,
(l) manually settable means for rendering said comparator operative in response to the energization of predetermined ones of said first and second outputs,
(m) and manually settable means for rendering said gating means jointly responsive to the setting of said bistable circuit and to the energization of predetermined ones of said first and second outputs.

4. An apparatus for processing coded characters stored in a storage medium, comprising in combination:
(a) means for sequentially reading out said characters,
(b) code recognition means fed by said reading means and having an ouptut for each one of a plurality of character codes, each output being adapted to be energized in response to every read-out character having the code corresponding to said output and being further adapted to be deenergized in response to every character having another code of said plurality,
(c) a plurality of registers for receiving coded character,
(d) means for addressing one of said registers,
(e) gating means for connecting said reading means to said registers,
(f) manually settable means for rendering said gating means responsive to the energization of predetermined ones of said outputs,
(g) and manually settable means for rendering said addressing means responsive to the energization of predetermined ones of said outputs.

5. An apparatus for processing coded characters stored in a storage medium, comprising in combination:
(a) means for sequentially reading out said characters,
(b) code recognition means fed by said reading means and having a first output for each one of a plurality of character codes, each first output being adapted to be energized in response to every read-out character having the code corresponding to said first output and being further adapted to be deenergized in response to every character having another code of said plurality.
(c) a plurality of registers for receiving coded characters,
(d) means for addressing one of said registers,
(e) gating means for connecting said reading means to said registers,
(f) counting means fed by said reading means and having a plurality of second outputs, said counting means having a start condition and being responsive to read-out characters having a predetermined code for sequentially energizing said second outputs and being further responsive to each read-out character having one of the codes of said plurality of codes for being reset to said start condition, (g) manually settable means for rendering said gating means jointly responsive to the energization of predetermined ones of said first and second outputs, (h) and manually settable means for rendering said addressing means responsive to the energization of predetermined ones of said first and second outputs.

References Cited by the Examiner

UNITED STATES PATENTS

| | | | |
|---|---|---|---|
| 2,767,908 | 10/56 | Thomas | 235—61 |
| 2,867,486 | 7/59 | Alexander | 340—342 |

ROBERT C. BAILEY, *Primary Examiner.*

MALCOLM A. MORRISON, *Examiner.*